United States Patent
Liberman

(10) Patent No.: US 11,235,487 B2
(45) Date of Patent: Feb. 1, 2022

(54) APPARATUS FOR PREPARING FOOD

(71) Applicant: Gregory Daniel Liberman, Oakville (CA)

(72) Inventor: Gregory Daniel Liberman, Oakville (CA)

(*) Notice: Subject to any disclaimer, the term of this patent is extended or adjusted under 35 U.S.C. 154(b) by 78 days.

(21) Appl. No.: 16/782,394

(22) Filed: Feb. 5, 2020

(65) Prior Publication Data

US 2021/0237300 A1    Aug. 5, 2021

(51) Int. Cl.
*B26D 7/06* (2006.01)
*A47J 37/12* (2006.01)
*B26D 1/02* (2006.01)

(52) U.S. Cl.
CPC ........ *B26D 7/0608* (2013.01); *A47J 37/1214* (2013.01); *A47J 37/1271* (2013.01); *A47J 37/1276* (2013.01); *B26D 1/02* (2013.01); *B26D 2210/02* (2013.01)

(58) Field of Classification Search
CPC .... B26D 7/0608; B26D 1/02; B26D 2210/02; A47J 37/1214; A47J 37/1271; A47J 37/1276
See application file for complete search history.

(56) References Cited

U.S. PATENT DOCUMENTS

| | | | | |
|---|---|---|---|---|
| 4,187,770 A | * | 2/1980 | Coffield | A47J 37/1257 241/92 |
| 5,193,440 A | * | 3/1993 | Frank | A47J 37/1214 99/330 |
| 8,616,105 B1 | * | 12/2013 | Davis | B26D 3/185 83/620 |
| 8,931,384 B2 | * | 1/2015 | Davis | B26D 5/12 83/435.17 |
| 2006/0075904 A1 | * | 4/2006 | Vadevoulis | A47J 37/1214 99/403 |
| 2018/0169880 A1 | * | 6/2018 | Whitney | B26D 7/0006 |

* cited by examiner

*Primary Examiner* — Omar Flores Sanchez
(74) *Attorney, Agent, or Firm* — McMillan LLP

(57) ABSTRACT

An apparatus for preparing food is provided, and includes a food-receiving chamber sized to receive at least one food item, a cutting structure configured to cut the at least one food item when pressed into contact therewith, an impeller for impelling the at least one food item into contact with the cutting structure, an oil chamber for storing oil, a heating system for heating the oil, and an oil introduction system in communication with the oil chamber, the oil introduction system being operable to introduce at least one of an oil mist and an oil spray in the frying chamber.

7 Claims, 4 Drawing Sheets

APPARATUS FOR PREPARING FOOD

FIELD

The specification relates generally to appliances, and in particular to an apparatus for preparing food.

BACKGROUND OF THE DISCLOSURE

French fried potatoes is a favorite food in many parts of the world, however making them properly is tedious with varying results. Potatoes must be cut to the correct size and shape and must then be fried in a hot oil bath. Typically, the fries then must either be shaken vigorously in a basket or colander or otherwise wiped with a towel to remove excess oil before seasoning and finally serving.

There are numerous safety concerns that arise when preparing French fried potatoes at home. Cutting the potatoes can be challenging for some people, especially younger people unaccustomed to handling a knife. The even cutting of the potatoes is important as potato portions of different sizes will cook unevenly. Further, the heating of the oil and the frying of the potato portions exposes the cooker to a risk of splashing and burns, as well as cooking fires.

Accordingly, there is a need for a novel approach to the preparation of French fries.

SUMMARY OF THE DISCLOSURE

In one aspect, there is provided an apparatus for preparing food, comprising a food-receiving chamber sized to receive at least one food item; a cutting structure configured to cut the at least one food item when pressed into contact therewith; an impeller for impelling the at least one food item into contact with the cutting structure; an oil chamber for storing oil; a heating system for heating the oil; and an oil introduction system in communication with the oil chamber, the oil introduction system being operable to introduce at least one of an oil mist and an oil spray in the frying chamber.

The cutting structure can include an array of blades arranged to chop the at least one food item. The array of blades can include at least one blade extending parallel to a first axis. The at least one blade can be at least one first blade, and wherein the array of blades includes at least one second blade extending parallel to a second axis that is one of oblique and perpendicular to the at least one first blade.

The impeller can include a set of projections that interpose between the array of blades.

The impeller can be driven by a motor to move towards the cutting structure.

In another aspect, there is provided an apparatus for preparing food, comprising: a frying chamber sized to receive one or more food items; an oil chamber for storing oil; a ventilation system for circulating air within the frying chamber; a heating system for heating the oil; and an oil introduction system in communication with the oil chamber, the oil introduction system being operable to introduce an oil mist in the frying chamber in a first mode, and being operable to introduce an oil spray in the frying chamber in a second mode.

The oil introduction system can include at least one mist outlet for introducing an oil mist in the frying chamber, and at least one oil spray outlet for introducing an oil spray in the frying chamber. The at least one oil mist outlet and the at least one oil spray outlet are selectively operable. The at least one oil mist outlet can be in communication with at least one oil conduit via at least one oil mist valve. The at least one oil spray outlet can be in communication with at least one oil conduit via at least one oil spray valve.

The heating system can include a heater for heating air circulated in the frying chamber.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
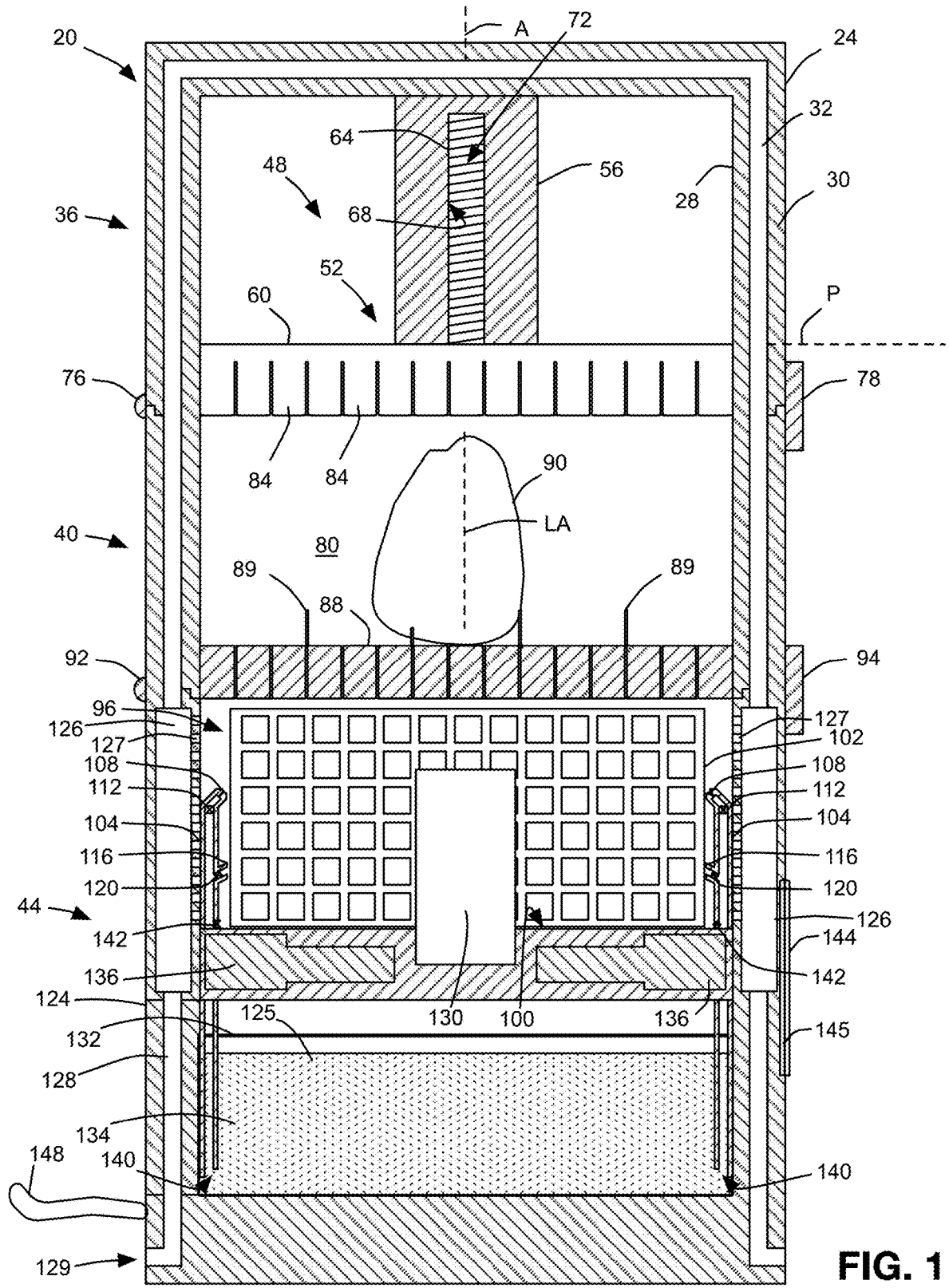
FIG. 1 shows an apparatus for preparing food in accordance with an embodiment thereof.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Non-enzymatic browning (also known as the Maillard reaction) occurs in potatoes when heated to approximately 302 degrees Fahrenheit. The browning occurs at the surface of the potato due to the water at the surface turning into superheated steam. This browning also changes the texture and flavor characteristics of the surface. Frying potatoes in oil baths achieves this temperature quickly causing the desirable reaction without the negative effect of drying out the potatoes.

An appliance 20 for frying foods in accordance with an embodiment is illustrated in FIG. 1. The appliance assists in the preparation of the foods for frying and performs the frying within a generally closed chamber, thereby reducing exposure of the user to cutting elements and hot oil used to cook the foods.

The apparatus 20 reduces the amount of oil that is required while achieving results that are similar to submersing food items or food item segments in oil. The apparatus 20 also handles the task of cutting and seasoning the food items without requiring any user intervention. A user simply inserts a food item, such as a potato, into the apparatus 20 and pushes a button to start the process, which results in a basket of cooked French fries or another fried food item after a short period of time.

The appliance 20 has a housing 24 that includes an inner shell 28 and an outer shell 30 that are made of stainless steel or some other heat-resistant material. An insulating layer 32 is sandwiched between the inner shell 28 and the outer shell 30 to reduce heat transfer from the inner shell 28 to the outer shell 30, thereby keeping the outer shell 30 cool to the touch when the appliance 20 is in operation. The insulating layer 32 can be formed of any suitable heat-resistant thermal insulation material, such as fiberglass.

The housing 24 is split into a top portion 36, a middle portion 40, and a base portion 44. Silicone can be employed to form gaskets where portions of the housing 24 are joined together.

The top portion 36 houses a press 48 that includes an impeller in the form of a plunger 52 driven by a motor 56. The plunger 52 is a metal plate 60 having a threaded drive shaft 64 extending from a central position thereof. The drive shaft 64 extends along an axis A that is generally perpendicular to a plane P defined by a top surface of the metal plate 60. The motor 56 has an aperture 68 with threading 72 on a peripheral surface thereof that mates with the threading of the drive shaft 64. The top portion 36 of the housing 24 is hingedly coupled to the middle portion 40 via a hinge 76 through which electrical wiring extends to power the motor 56. A latch 78 openably secures the top portion 36 to the middle portion 40.

The middle portion 40 of the housing 24 has a food-receiving chamber 80 having a non-circular profile. The food-receiving chamber 80 is sized to receive at least one food item, such as a potato 90. The plunger 52 has a corresponding profile so that rotation of the plunger 52 about the axis A within the food-receiving chamber is inhibited. A set of projections 84 extend axially parallel to the axis A in an opposite directed from the drive shaft 64.

Figure 2A:
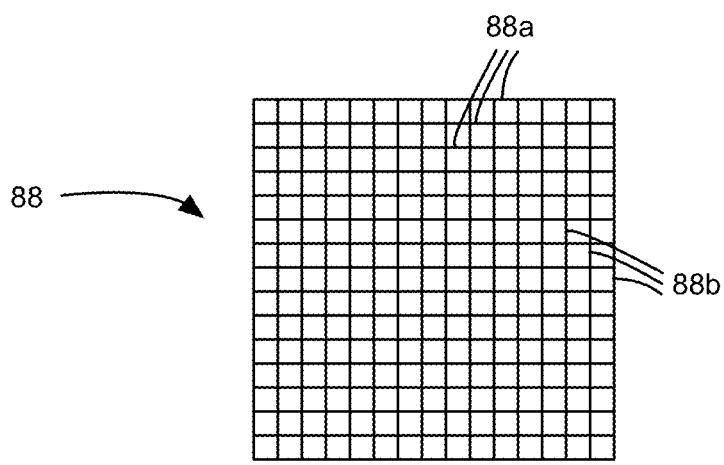
FIG. 2A is a plan view of a slicer grating of the appliance of FIG. 1.

A cutting structure in the form of a slicer grating 88 of the appliance 20 is shown in FIG. 2A. The slicer grating 88 is positioned at a bottom of the middle portion 40, and includes two sets of blades 88a, 88b. The blades 88a, 88b within each set are arranged parallel to one another, and generally perpendicular to the blades 88a, 88b of the other set to form an array. The blades 88a, 88b of the slicer grating 88 are configured to cut the at least one food item when pressed into contact therewith. The blades 88a, 88b are arranged so that the set of projections 84 fit therebetween to urge parts of the food item(s) being cut out from between the blades 88a, 88b.

A set of spikes 89 extends from a surface of the slicer grating 88 to engage and retain food that is positioned atop of the slicer grating 88. It can be desirable to slice certain foods into longer or shorter segments. In the illustrated example of the potato 90, for example, it can be desirable to cut the potato 90 lengthwise along its longest axis LA. The spikes 89 enable positioning of the potato 90 so that the potato 90 is cut parallel to this axis LA.

The middle portion 40 is coupled to the base portion 44 via a hinge 92 through which electrical wiring extends to power the motor 56. A latch 94 openably secures the middle portion 40 to the base portion 44.

The base portion 44 includes a frying chamber 96 having a floor 100. A basket 102 is positioned within the frying chamber 96. The basket 102 is made of stainless steel or another suitable material that can withstand the temperature and is generally inert so that it will not react with cooking oil. A separate handle (not shown) can be removably attached to the basket 102 to enable safe removal of the basket 102 from the appliance 20 upon completion of the cooking process. In another embodiment, the basket 102 may be omitted, in which case a person can remove food segments via a set of tongs, a fork, etc. Other mechanisms that can be used with the appliance for facilitating the removal of the fried food segments will occur to those skilled in the art.

An oil introduction system includes a set of oil conduits 104 extend into the frying chamber 96 from the floor 100. Each of the set of oil conduits 104 has a mist outlet 108 in communication with the oil conduit 104 via a mist outlet valve 112. In addition, each of the set of oil conduits 104 has a spray outlet 116 in communication with the oil conduit 104 via a spray outlet valve 120. The mist outlet 108 and the spray outlet 116 are spaced from the floor 100 of the frying chamber 96.

An oil pod 132 is positioned in a lower part of the base portion 44, and holds seasoned cooking oil 125 for seasoning the food while cooking it. The cooking oil 125 can be seasoned in any manner as desirable for seasoning the fried food, as long as the seasoning is able to withstand the heat of the process. The oil pod 132 can be inserted and removed via a drawer 124 of the base portion 44.

An oil pump 136 of the oil introduction system is coupled to the set of oil conduits 104 towards input ends 140 of the oil conduits 104. The oil conduits 104 are controllable to extend into the oil pod 132 once positioned in the base portion 44 and retract upon completion of the cooking process. The oil pump 136 is configured to pump the cooking oil 125 from the oil pods 132 through the oil conduits 104 and to one of the mist outlets 108 and the spray outlets 116.

While, in the illustrated embodiment, the appliance 20 is shown employing a single oil pod 132, it is possible to configure the appliance with two oil pods that are half-puck shaped. Further, in other embodiments, the appliance can be configured to hold any number of oil pods. Other methods of supplying cooking oil for use by the appliance will occur to those skilled in the art. For example, the appliance can include an oil reservoir that can be refilled as needed and drawn from.

A drainage valve 142 along each oil conduit 104 is positioned adjacent to the floor 100. The drain valves 142 enable drainage of oil from the frying chamber 96 back into the oil pod 132 that is removable to facilitate reuse, recycling, or disposal thereof once the cooking oil is cooled.

The oil introduction system is in communication with the oil pod 132 and is operable to introduce at least one of an oil mist and an oil spray in the frying chamber 96. Closing of the drainage valves 142 enables the cooking oil 125 to pool in the frying chamber 96 when sprayed therein via the oil introduction system. The cooking oil 125 fills the frying chamber 96 sufficiently to deep fry the food segments in the frying chamber 96.

Opening of the drainage valves 142 enables the oil in the frying chamber 96 to be drained/pumped back into the oil receptacle 124 via the oil pump 136.

A set of air inlets 129 toward the base of the housing 24 enable air to be drawn in through a set of air conduits 128 via a set of fans 126 in the side walls of the housing 24. The fans 126 are positioned to blow the air through angled apertures 127 in the inner shell 28 into the frying chamber 96 to form a gentle vortex of heated air within the frying chamber 96. The air inlets 129 include a filter to filter the intaken air. A heater element 130 extends into the frying chamber 96 to heat the circulated air. The heating element 130 can be any type of suitable heater for heating the drawn air. In a preferred embodiment, the heating element 130 is a heating coil.

A control interface 144 has a set of buttons for controlling operation of the apparatus 20, including a button for selecting air frying or immersion frying, a start button for commencing operation of the apparatus 20, a stop button for terminating operation of the apparatus 20, and a control for lengthening or shortening the cooking time. The control interface 144 is coupled to a controller 145 that controls operation of the appliance at least in response to interactions with the control interface 144. The controller 145 can include one or more processors, random access memory for use by the one or more processors, storage for storing computer-executable instructions that are executed by the one or more processors. In another configuration, the controller 145 can include an Application-Specific Integrated Circuit ("ASIC"). Other types of controllers for controlling operation of the appliance 20 will occur to those skilled in the art.

A power cord 148 extends from the housing 24 for providing power to the apparatus 20.

In order to prepare foods using the apparatus 20, a user opens the drawer 124 and inserts an oil pod 132 with cooking oil 125 seasoned to their taste into the base portion 44, and closes the drawer 124. The user then opens the latch 78, and pivots the top portion 36 relative to the middle portion 40 via the hinge 76 to access the food-receiving chamber 80. One or more food items, such as the potato 90, are placed inside the food-receiving chamber 80, and then the top portion 36 is pivoted back atop the middle portion 40. The latch 78 is then closed.

The user can then select whether to air fry or immersion fry the food items and the length of the cooking time via a first button of the control interface 144, and subsequently commence operation of the apparatus 20 via a start button of the control interface 144. Upon depressing the start button, the latches 78, 94 are locked by a control system to prevent opening of the apparatus 20 during operation. The controller 145 commences operation of the heating element 130. The oil conduits 104 are driven into the oil pod 132 to pierce a top self-sealing surface thereof. The motor 56 then drives the metal plate 60 of the plunger 52 towards the food items in the food-receiving chamber 80. As the metal plate 60 pushes into contact with the food items, the food items are pushed into the sharpened edges of the blades 88a, 88b of the slicer grating 88 to thereby slice/segment the food items. Continued operation of the motor 56 drives the plunger 52 to push the food items at and through the slicer grating 88. Some of the food item segments may become lodged between blades 88a, 88b of the slicer grating 88. The projections 84 formed by channels in the metal plate 60 enter spaces between the blades 88a 88b of the slicer grating 88 to urge food item segments out of the slicer grating 88 and into the frying chamber 96. The plunger 52 is driven until the projections 84 almost extend out of the slicer grating 88, after which the motor 56 is controlled to reverse operation so that the plunger 52 is retracted upwards back towards the motor 56.

If the user selects to air fry, and once the target temperature is reached by the heating element 130, the controller 145 commences operation of the fan 124, thereby circulating air in the frying chamber 96 where it is heated by the heating element 130 until the circulated air reaches a target temperature of 302 degrees Fahrenheit.

The oil pump 136 is then commenced to cause the oil 125 to be drawn from the oil chamber 132 and pushed through the oil conduits 104. Based on the frying mode selection made by the user, the mist outlet valve 112 or the spray outlet valve 120 is opened to cause either a mist or a spray of the seasoned oil to be continuously pumped into the frying chamber 96 that has hot air circulated therearound. The misted or sprayed seasoned oil is heated through contact with the hot air and coats the food item segments generally uniformly to cook the food item segments and add flavor, while protecting them from becoming dried out during the cooking process. Where air frying is selected, the heated oil mist comes into contact with the surface of the food item segments. Where immersion frying is selected, the oil accumulates in the frying chamber 96 and is heated by contact with the heating element 130 to fry the food item segments.

Upon the passing of a set frying time period, operation of the heating element 128 and the oil pump 136 is terminated. The used cooking oil 125 is pumped back into the oil pod 132 after a pre-determined time period. The oil pod 132 is made of a suitable material to withstand the heat. At the same time or after, the control circuit unlocks the latches 78, 94, after which the user can pivot the middle portion 40 relative to the bottom portion 44 to retrieve the fried food item segments.

The cutting structure can be any known arrangement for cutting at least one food item when pressed into contact. For example, in another embodiment, a criss-cross of strong wires can be employed to slice food items. In another embodiment, a set of blades arranged parallel to one another can be employed to create slices of the food item. Another set of blades that are parallel can be positioned one of oblique and perpendicular to the first set to cross-cut the food item. In a further embodiment, a plate with grating blades for cutting the food item when rotated and pressed against the plate can be employed.

The sets of blades in the slicer grating can be arranged in any orientation so that food items urged thereon are segmented. Preferably, lateral sides of the blades extend generally parallel to the axis A so that the food items are driven straight along axes parallel to the axis A.

Figure 2B:
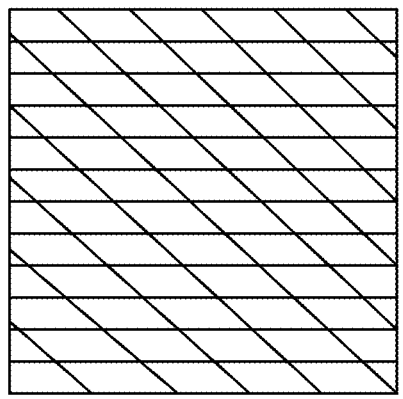
FIGS. 2B to 2E are plan views of cutting structures for cutting food items in apparatuses like that of FIG. 1 in accordance with various embodiments.
Figure 2C:
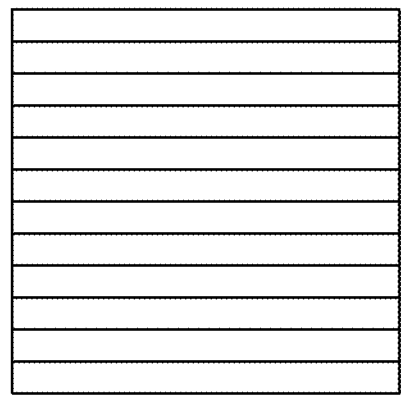

FIGS. 2A, 2B, and 2C show slicer gratings in accordance with alternative embodiments. FIG. 2A shows a slicer grating having two sets of parallel blades, wherein the two sets of blades are oblique to one another. The slicer grating of FIG. 2B has a set of blades that extend parallel to one another to slice a food item into slices. The slicer grating of FIG. 2C includes a set of blades that do not extend across the entire profile of the interior of the apparatus. The impeller employed with the slicer gratings of FIGS. 2A to 2C can be constructed to have corresponding channels to receive the blades and projections formed between the channels to interpose between the blades to thereby clear food item segments from between the blades.

Figure 2D:
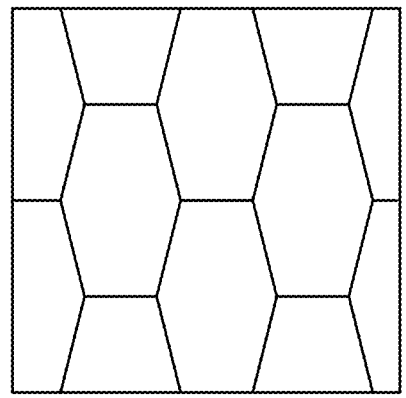
Figure 2E:
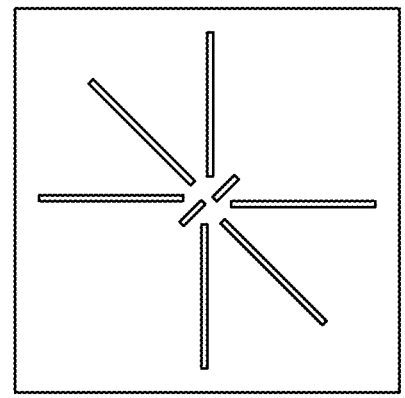

FIG. 2D shows a cutting structure that is a metal plate having a set of radially extending slots with sharpened edges. The cutting structure is used with an impeller having a profile that is dimensioned so that it can rotate about the axis A within the housing. The impeller can be driven to urge food items into contact with the cutting structure while rotating the food items about the axis A, thereby causing the food items to be cut by the cutting structure.

Figure 3A:
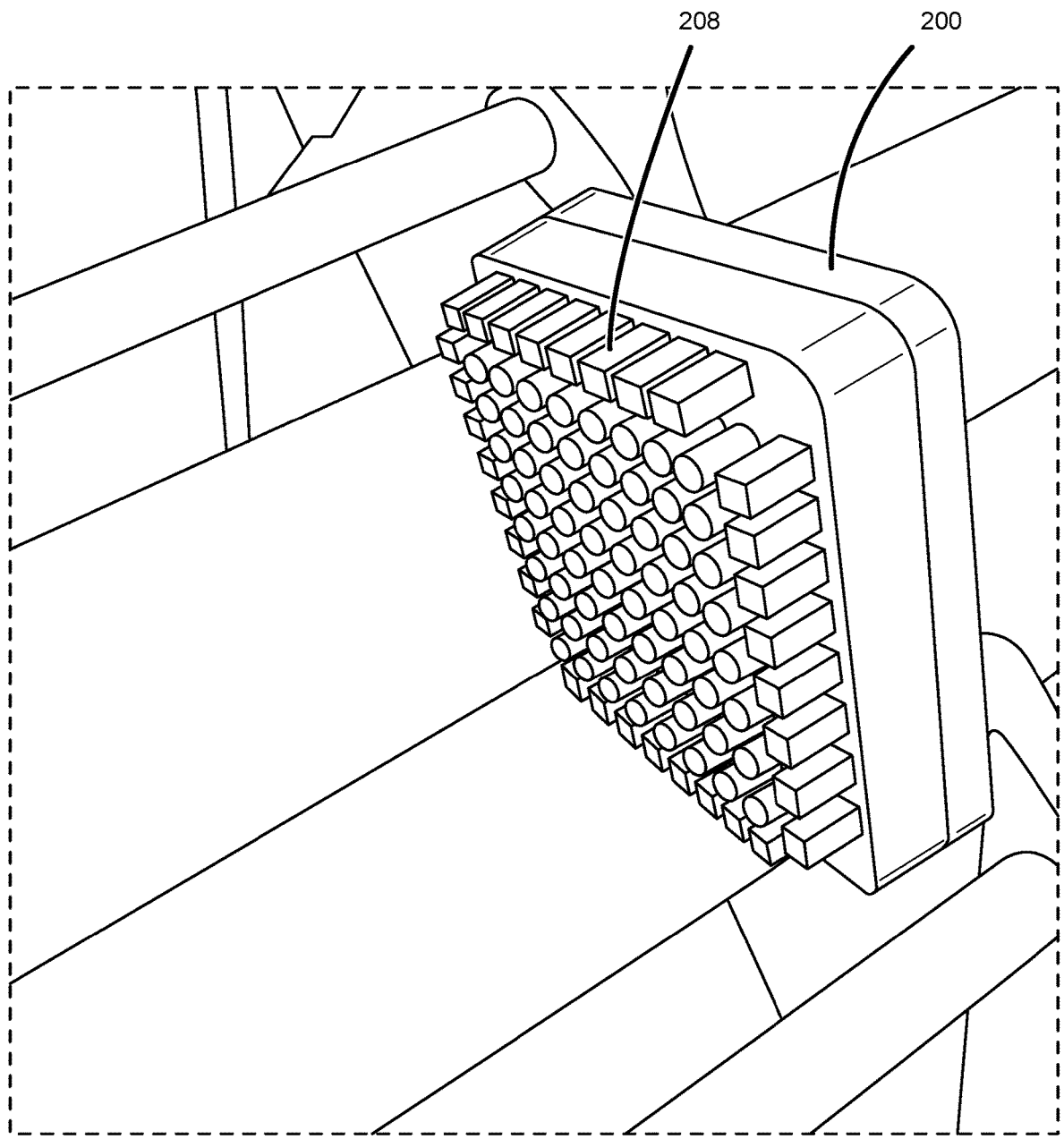
FIG. 3A is an image of a plunger with a set of projections in accordance with another embodiment.
Figure 3B:
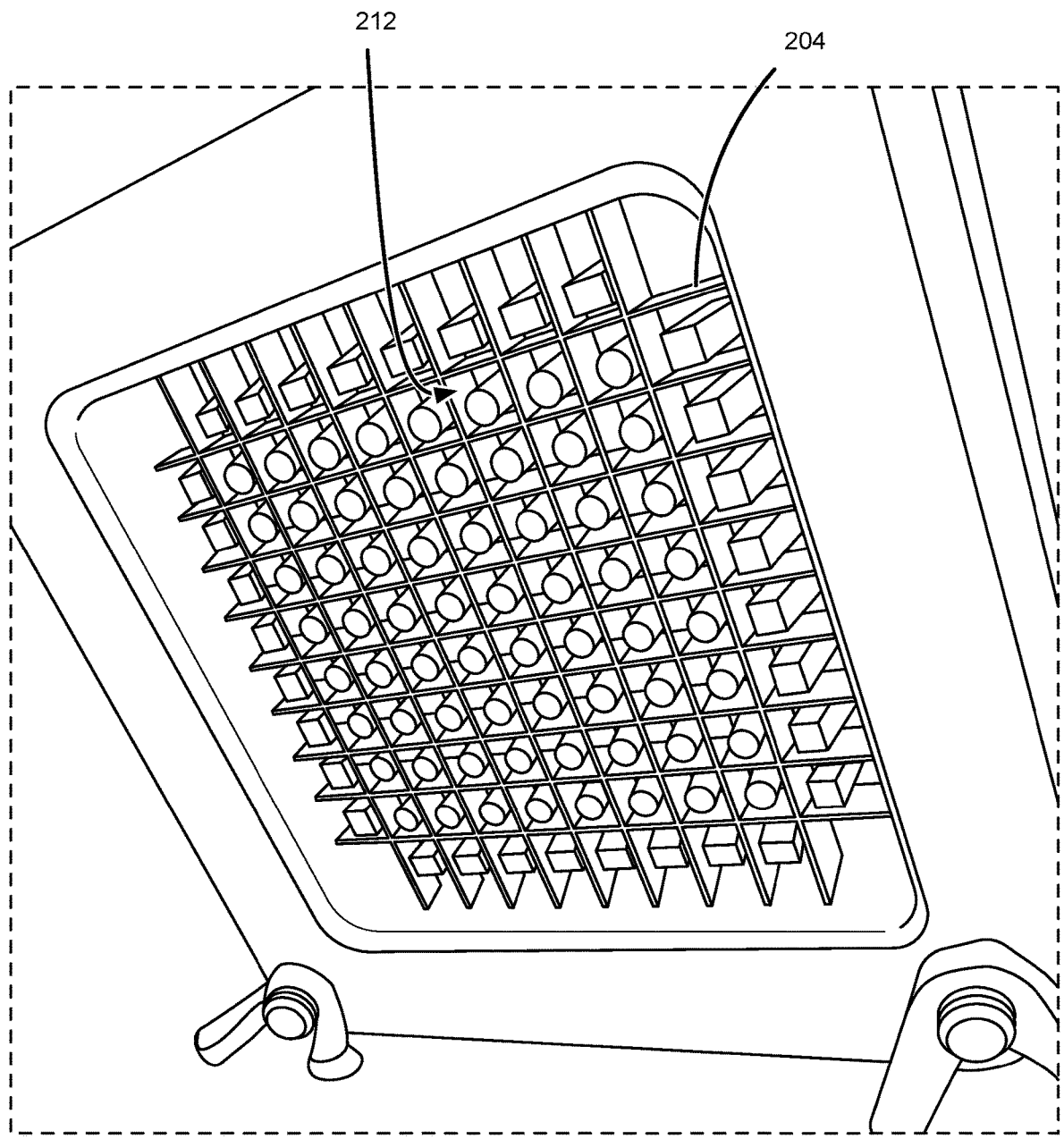
FIG. 3B shows the projections of the plunger of FIG. 3A interposed between blades of a cutting arrangement.

A plunger 200 and slicer grating 204 in accordance with another embodiment is shown in FIGS. 3A and 3B. The plunger 200 is driven towards the slicer grating 204 by a motor, and includes a set of projections 208 that mate with apertures 212 in the slicer grating 204.

In other embodiments, the apparatus can include one or both of oil misting outlets and oil spraying outlets. In some embodiments, the oil introduction system can heat the oil being conveyed to the frying chamber.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto.

LIST OF REFERENCE NUMERALS 20 appliance
24 housing
28 inner shell
30 outer shell
32 insulating layer
36 top portion
40 middle portion
44 base portion
48 press
52 plunger
56 motor
60 metal plate
64 drive shaft
A axis
P plane
68 aperture
72 threading
76 hinge
78 latch
80 food-receiving chamber
84 projections
88 slicer grating
88a blade
88b blade
89 spike
90 potato
LA longitudinal axis
92 hinge
94 latch
96 frying chamber
100 floor
102 basket
104 oil conduit
108 mist outlet
112 mist outlet valve
116 spray outlet
120 spray outlet valve
124 drawer
125 cooking oil
126 fan
127 aperture
128 air conduit
129 air inlet
130 heating element
132 oil pod
125 cooking oil
136 oil pump
140 input end
142 drainage valve
144 control interface
145 controller
148 power cord
200 plunger
204 slicer grating
208 projection
212 aperture

What is claimed is:

1. An apparatus for preparing food, comprising:
a frying chamber sized to receive one or more food items;
an oil chamber configured to store oil;
a ventilation system for circulating air within the frying chamber;
a heating system for heating the oil; and
an oil introduction system in communication with the oil chamber, the oil introduction system being operable to introduce an oil mist in the frying chamber in a first mode, and being operable to introduce an oil spray in the frying chamber in a second mode.

2. The apparatus of claim 1, wherein the oil introduction system comprises at least one mist outlet for introducing an oil mist in the frying chamber, and at least one oil spray outlet for introducing an oil spray in the frying chamber.

3. The apparatus of claim 2, wherein the at least one oil mist outlet and the at least one oil spray outlet are selectively operable.

4. The apparatus of 3, wherein the at least one oil mist outlet is in communication with at least one oil conduit via at least one oil mist valve.

5. The apparatus of 3, wherein the at least one oil spray outlet is in communication with at least one oil conduit via at least one oil spray valve.

6. The apparatus of 4, wherein the at least one oil spray outlet is in communication with at least one oil conduit via at least one oil spray valve.

7. The apparatus of claim 1, wherein the heating system includes a heater for heating air circulated in the frying chamber.

* * * * *